(12) United States Patent
Doganata et al.

(10) Patent No.: US 7,676,452 B2
(45) Date of Patent: Mar. 9, 2010

(54) METHOD AND APPARATUS FOR SEARCH OPTIMIZATION BASED ON GENERATION OF CONTEXT FOCUSED QUERIES

(75) Inventors: Yurdaer N. Doganata, Chestnut Ridge, NY (US); Youssef Drissi, Ossining, NY (US); Tong-Haing Fin, Harrison, NY (US); Genady Grabarnik, Irvington, NY (US); Moon J. Kim, Wappingers Falls, NY (US); Lev Kozakov, Stamford, CT (US); Sheng Ma, Briarcliff Manor, NY (US); Juan Leon Rodriguez, Danbury, CT (US)

(73) Assignee: International Business Machines Corporation, Armonk, NY (US)

( * ) Notice: Subject to any disclaimer, the term of this patent is extended or adjusted under 35 U.S.C. 154(b) by 923 days.

(21) Appl. No.: 10/202,564

(22) Filed: Jul. 23, 2002

(65) Prior Publication Data

US 2004/0019588 A1    Jan. 29, 2004

(51) Int. Cl.
*G06F 17/30* (2006.01)
(52) U.S. Cl. .................... 707/3; 707/4; 707/5
(58) Field of Classification Search ................. 707/3–5
See application file for complete search history.

(56) References Cited

U.S. PATENT DOCUMENTS

| | | | | |
|---|---|---|---|---|
| 5,878,423 A | * | 3/1999 | Anderson et al. | 707/100 |
| 5,987,457 A | * | 11/1999 | Ballard | 707/5 |
| 6,424,973 B1 | * | 7/2002 | Baclawski | 707/102 |
| 6,516,312 B1 | * | 2/2003 | Kraft et al. | 707/3 |
| 6,523,026 B1 | * | 2/2003 | Gillis | 707/3 |
| 6,560,634 B1 | * | 5/2003 | Broadhurst | 709/203 |
| 6,636,848 B1 | * | 10/2003 | Aridor et al. | 707/3 |
| 6,928,432 B2 | * | 8/2005 | Fagan et al. | 707/3 |
| 7,117,199 B2 | * | 10/2006 | Frank et al. | 707/3 |
| 7,318,057 B2 | * | 1/2008 | Aridor et al. | 707/3 |

(Continued)

OTHER PUBLICATIONS

"dBlue—An advanced enterprise information search and delivery system"; http://websphere.sys-con.com/read/43255.htm; Doganata Y., Drissi Y., Fin T., Brown G., Kim M., Kozakov L.; published Oct. 2002.*

(Continued)

*Primary Examiner*—Charles Rones
*Assistant Examiner*—Mellissa M Chojnacki
(74) *Attorney, Agent, or Firm*—Harrington & Smith, PC

(57) ABSTRACT

Disclosed is a method and apparatus for operating a search system for searching a search space containing domains each representing a collection of related documents. The method includes establishing a domain characterization model (DCM) that includes a DCM index containing keywords and, for each keyword, an identification of a domain where the keyword is found. In response to an original search query, the method forms one or a plurality of enhanced search queries in accordance with the DCM for searching a plurality of domains. Each enhanced search query is formed for searching a particular targeted domain and contains the original search query and at least one keyword associated with the particular domain. The search results are clustered and are displayed so as to be organized by the domains that were searched. The top search results returned in response to each enhanced search query belong to one of the targeted domains.

16 Claims, 5 Drawing Sheets

U.S. PATENT DOCUMENTS

| | | | |
|---|---|---|---|
| 2001/0021947 A1* | 9/2001 | Kim | 709/217 |
| 2002/0059289 A1* | 5/2002 | Wenegrat et al. | 707/102 |
| 2004/0030690 A1* | 2/2004 | Teng et al. | 707/3 |
| 2005/0065774 A1* | 3/2005 | Doganata et al. | 704/7 |
| 2006/0036588 A1* | 2/2006 | Frank et al. | 707/3 |

OTHER PUBLICATIONS

Cooper, et al., "OBIWAN—A Visual Interface for Prompted Query Refinement", HICSS (2), 1998, pp. 277-285.

Biebow, et al., "TERMINAE: a method and a tool to build a domain ontology", (http://citeseer.nj.nec.com/471143.html).

* cited by examiner (PAGE 1 DISPLAY)

US 7,676,452 B2

METHOD AND APPARATUS FOR SEARCH OPTIMIZATION BASED ON GENERATION OF CONTEXT FOCUSED QUERIES

TECHNICAL FIELD

These teachings relate generally to computer-implemented document searching methods and apparatus and, more specifically, relate to text-based search engines.

BACKGROUND

The quality of a query-based full text search can be defined in terms of the relevancy level of the top search results (e.g., the top 10-20 results). For the purposes of this patent application, the function of a search engine is to locate documents that contain one or more query terms supplied by a user, and to assign a highest score or rank to the document or documents that meet certain statistical or other criteria as applied to the query terms.

This particular technique is adequate for many applications so long as the query contains terms that can be used to unambiguously identify the subject of the search, otherwise the top search results may contain links to irrelevant documents.

As an example, reference can be made to FIG. 1 for showing the schema of a conventional search service. A search space 1 contains multiple document collections that may belong to different subject domains 1A (e.g., Domains1-3). A search engine 2 operates on a full text index 3 of the search space 1, created by indexing words in all document collections. A query processor 4 passes a given user query 5 to the search engine 2. The search engine 2 finds those documents containing the query terms, using the full text index 3 of the search space 1. The scores that are assigned to the found documents depend on certain statistical criteria as applied to the query terms. A results processor 6 renders the search results ordered by their score for presentation to the user.

Reference with regard to search engines can be had to the following exemplary publications: Michael W. Berry, Murray Browne, "Understanding Search Engines: Mathematical Modeling and Text Retrieval (Software, Environments, Tools)", Society for Industrial & Applied Mathematics, June 1999, ISBN: 0898714370; and Berthier Ribeiro-Neto, Ricardo Baeza-Yates, "Modern Information Retrieval (ACM Press Series)", Addison-Wesley Pub Co, May 1999, ISBN: 20139829X.

A problem results when some number of the returned top search results belong to different subject domains 1A in the search space 1, independent of the actual search subject. This is an undesirable situation, as it limits the usefulness of the returned search results.

This problem has been previously addressed by J. Cooper and R. Byrd in: "OBIWAN—A Visual Interface for Prompted Query Refinement", HICSS (2), 1998, pp. 277-285. These authors propose various extensions to a traditional search service in order to avoid the problem of ambiguous search results. One extension is to provide additional sophisticated indices to document collections, based upon domain-specific vocabularies that contain multi-word names and terms. Another extension provides Context Thesauruses that specify relations between vocabulary items. The use of Lexical Networks is also proposed, where vocabulary items are network nodes and relations are links between the nodes. These authors further propose to create a mechanism that allows a look-up of vocabulary items related to the original query terms, and an ability to suggest additional terms that the user may employ to better focus the query. Also proposed is a Graphical User Interface (GUI) that allows the user to select one or more vocabulary items suggested by the Context Thesaurus in response to the user query. Selected items are then added to the query terms to focus the query. The user in this case needs to repeat the query refinement process for each new set of selected items until the user is satisfied with the results.

As can be appreciated, this approach adds complexity and cost to the search engine implementation, and furthermore requires the active participation of the user in the query refinement process, a requirement that some users, in particular unsophisticated users, may find burdensome.

SUMMARY OF THE PREFERRED EMBODIMENTS

The foregoing and other problems are overcome, and other advantages are realized, in accordance with the presently preferred embodiments of the teachings of this invention.

In one aspect this invention overcomes the problems inherent in the prior art by using a domain characterization model (DCM), as opposed to building more complex and expensive context thesauruses and lexical networks. In another aspect this invention provides a simple search index and a related method that allows the search engine to identify those domains that are most relevant to a given search query. In a further aspect this invention provides a method of clustering search results, based on suggested search subjects, thereby enabling the user to avoid having to repeat query refinement steps.

In order to improve the search service experience of the user, in terms of the relevancy of the best results that are returned to the user, this invention extends an original search query by automatically adding generated query terms that are relevant to each identified search domain context. Submitting the resulting context-focused queries enables the search engine to significantly increase the scores or ranks of those documents that are most relevant to the suggested search subject. The search results are organized into clusters, with one cluster for each suggested search subject, thereby enabling the user to avoid having to repeat query refinement steps.

Disclosed herein is a method, an apparatus, a search system and a computer program stored on a medium that is readable by a computer. The disclosed method is for operating a search system for searching a search space containing domains each representing a collection of related documents. The method includes establishing a domain characterization model (DCM) that includes a DCM index containing keywords and, for each keyword, an identification of a domain where the keyword is found. In response to an original search query, the method forms one or a plurality of enhanced search queries in accordance with the DCM for searching a plurality of domains. Each enhanced search query is formed for targeting a particular domain and contains the original search query and at least one keyword associated with the particular domain. The search results are clustered and are displayed so as to be organized by the domains that were targeted. The top search results returned in response to each enhanced search query belong to one of the targeted domains.

When displaying the search results at least one refinement category may also be displayed for representing a sub-set of documents in a particular domain whose search results are currently being displayed. In response to the user selecting a refinement category, the search results are filtered so as to display only those search results related to documents found in the sub-set of documents associated with the selected refinement category.

In accordance with an aspect of the invention the method displays search results obtained for a first domain that was targeted, and may further display an identification of at least one other domain that was targeted, and in response to a user selecting at least one other domain, displays the search results obtained for the selected at least one other domain.

In the presently preferred embodiment of this invention a plurality of enhanced search queries may be issued substantially simultaneously to a search engine for use in searching the plurality of domains in parallel.

The DCM index is used to find keywords, related to different domains, and these keywords are then added to the original query term(s). The modified (enhanced) queries are then submitted to the search engine. The search is preferably done in the entire search space (not just in each particular domain), but the top results returned for each submitted enhanced query belong to the domain associated with this query. This is true because the keywords that were added to the query are associated with this domain. As such, the enhanced queries are "domain-focused" queries, and it should be appreciated that an enhanced query is formed for targeting a particular domain, not for searching a particular domain.

The DCM index contains individual keywords as well as keyword combinations. Each keyword combination is composed of a plurality of words. For each keyword and keyword combination, also provided is an identification of a domain where the keyword or keyword combination is found. In response to the original search query, the method forms at least one of the plurality of enhanced search queries so as to contain the original search query and at least one keyword and/or keyword combination.

Forming the plurality of enhanced search queries involves operating a domain context matcher to identify at least one relevant search subject context for the original search query, and to retrieve relevant keywords and keyword combinations from the DCM index for each identified search subject context. The method further involves operating a context focused query generator to generate domain-focused search query extensions using retrieved relevant keywords and keyword combinations, where relevant keywords and keyword combinations associated with a particular domain are added to the original search query to form one of the enhanced search queries.

An initial step of building the DCM index involves creating the sets of keywords and keyword combinations that characterize a given domain. This process may be accomplished by using a tool to extract glossaries of terms from documents included in each particular domain, and identifying keywords and combinations that appear only in one glossary, or only in two glossaries (in this case the keyword characterizes two domains), etc. A search engine is not required for this process. Instead, the search engine is preferably used after the sets of keywords for each domain have been gathered for creating the DCM index, or look-up table, that allows finding keywords that match the original query terms.

The search engine is used at this phase to index all located keywords keyword combinations and to associate and store as an entry in the DCM index a keyword or keyword combination with an identification of the domain in which the keyword or keyword combination is found. In this case forming a plurality of enhanced search queries involves applying the original search query to the DCM index to retrieve at least one entry that is related to the original search query, and combining a the keyword or keyword combination of the retrieved entry with the original search query to form the domain-focused, enhanced search query.

BRIEF DESCRIPTION OF THE DRAWINGS

The foregoing and other aspects of these teachings are made more evident in the following Detailed Description of the Preferred Embodiments, when read in conjunction with the attached Drawing Figures, wherein.

DETAILED DESCRIPTION OF THE PREFERRED EMBODIMENTS

Figure 1:
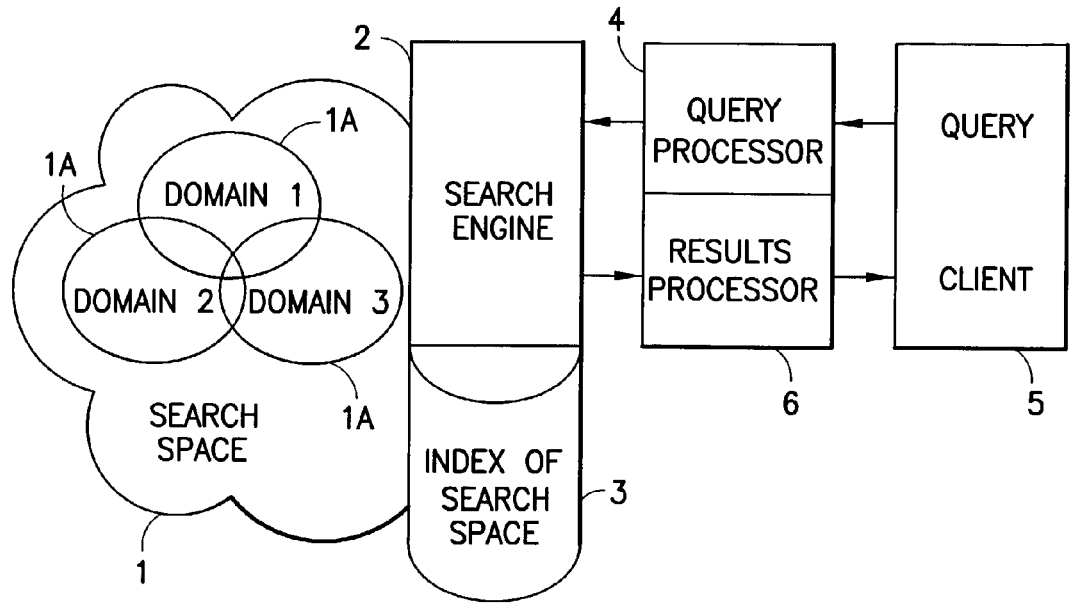
FIG. 1 is simplified block diagram of a conventional search service.
Figure 2:
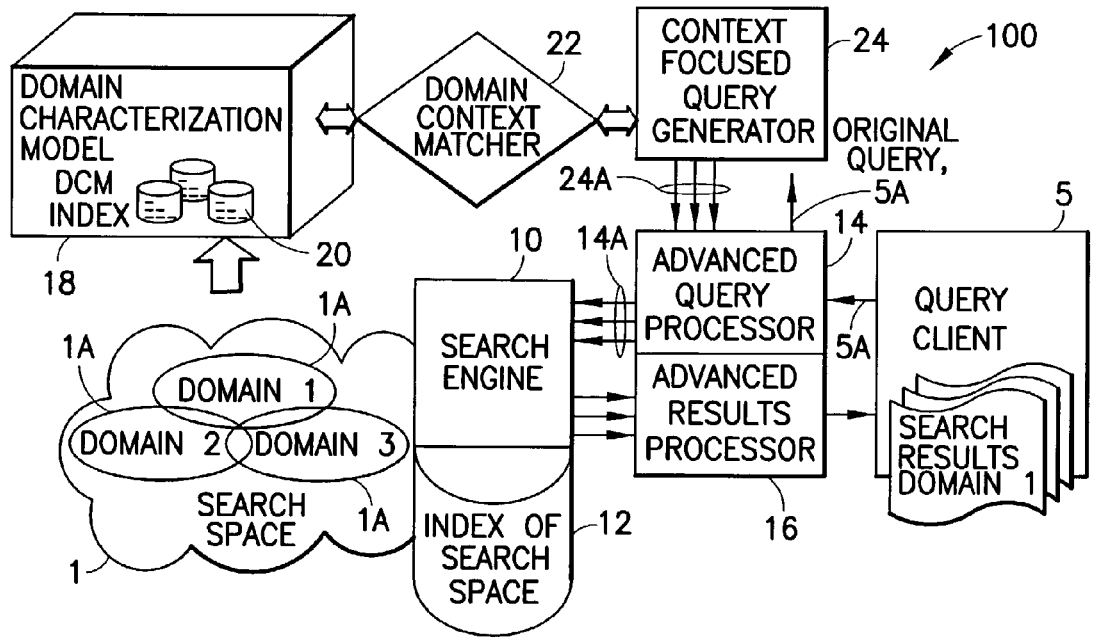
FIG. 2 is a block diagram of a search service in accordance with a presently preferred embodiment of this invention.

FIG. 2 is a block diagram of a search service 100 in accordance with a presently preferred embodiment of this invention. As in FIG. 1, it is assumed that there exists a search space 1 having a plurality of domains 1A (e.g., for simplicity shown as three domains: Domain1, Domain2, Domain3). A search engine 10 and an associated index of search space 12 are coupled between the search space 1 and an advanced query processor 14 and an advanced results processor 16. The advanced query processor 14 and the advanced results processor 16 operate with a client query subsystem 5 that is provided, in accordance with an aspect of this invention, improved search results for various domains 1A, e.g., for Domain1, Domain 2 and Domain3. The search service 100 further includes, in accordance with this invention, a domain characterization model (DCM) module 18 that contains DCM Indices 20, a Domain Context Matcher 22 and a Context Focused Query Generator 24. These various modules and sub-systems are assumed to be implemented by some combination of hardware and software by one or a plurality of computers.

The foregoing modules and sub-systems, in accordance with this invention, cooperate and interact with one another to identify relevant search domains for a given search query in order to increase the quality of the search results. This is preferably achieved by better focusing the query to relevant context(s). In order to achieve this goal an original search query 5A is automatically combined with terms that characterize the context of the identified search domain(s). An extended or enhanced query or queries 14A are then sent to the search engine 10 that in turn provides a search, preferably a full text search, in the search space 1 that contains the multiple subject domains 1A. Based on the improved context-focused enhanced search queries 14A, the search engine 10 significantly increases the scores/ranks of the documents most relevant to the suggested search domain(s). The invention also provides for clustering search results, based on the search subject context. Thus, the relevancy levels of the top search results for each identified search subject context are increased significantly, and the user is provided with relevant search results for a selected context.

The invention employs the above-mentioned DCM 18 to provide simple search indexes, allowing the search engine 10 to identify the domain or domains 1A that are most relevant to a given original search query 5A. The search indexes are used by the domain context matcher 22 to identify relevant search subject context(s) for a given search query 5A, and to retrieve relevant keyword combinations for each identified context. The context focused query generator 24 obtains keyword combinations relevant to identified subject context(s) from the domain context matcher 18, and generates domain-focused query extensions that are added to the original query 5A to form one or more enhanced queries 14A. The advanced query processor 14 submits the domain-focused enhanced query or queries 14A to the search engine 10, and the search engine 10 then operates to produce a set of search results for each submitted query 14A. The advanced results processor 16 operates to organize the search results into clusters, one cluster for each identified search subject context or domain 1A. The user is preferably then allowed to choose one of the suggested search results clusters, based on the selected search subject context, as is described in further detail below with regard to FIG. 6.

Having thus provided an overview of the search service 100, the following description will treat in further detail the DCM 18, as well as the special indices 20 used by the DCM 18, the process of identifying domains relevant to a given query, the categorization of search results and related processes.

The overall search process in accordance with this invention begins with the creation of the DCM 18, more specifically the creation of the DCM indices 20. The DCM 18 characterizes topics or search domains covered by a given collection of documents, and allows each search domain 1A (e.g., Domain1, Domain2, Domain3) to be associated with a set of keywords, such as single keywords, pairs of keywords, keyword triples, keyword quads, and so forth. The process that matches a given search query to a set of keywords is mediated through the DCM index 20. The DCM index 20 contains the indexed keywords and keyword combinations for each identified search domain 1A.

The creation of the DCM 18 is thus based on extracting keywords from a given document collection within a certain search domain 1A. A given keyword may comprise a single keyword that characterizes the search domain implicitly, without a need for an additional specifier or specifiers. For example, the keyword "motherboard" implicitly characterizes computer hardware. A combination may have more than one keyword. In this case the keywords complement and/or refine one another, and rely on one another to provide a focused meaning. For example, the keyword combination pair "Java exception" specifies the error concept in the Java programming language, while each of the constituent words when taken alone: "Java" or "exception", does not have such a specific focus.

For simplicity, and unless otherwise indicated, hereafter a reference to "keyword" or "keywords" is implied to be a reference to a single keyword, or to a keyword combination, i.e., to a multi-word phrase that ideally is found in only one domain 1A, or to both a single keyword and a keyword combination.

In the preferred embodiment of this invention the DCM index 20 is created before the searcher 100 is run for the first time, and the DCM index 20 may then be updated in the background as documents are added to and removed from the various domains 1A. The domains 1A preferably each represent a collection of documents that are related to some common theme or schema. For example, one domain 1A may contain documents related to software drivers for laptop computers, while another domain 1A may contain documents related to a specific programming language. Of course, the domains are not restricted to containing documents for engineering or scientific subjects, and could contain documents related to any suitable subject including, as examples only, art, history, pet care, medicine and home maintenance. A given document may contain text or a combination of text and images. Note as well that different domains 1A may have intersections, such as domains for "pet care" and "allergic reactions".

Figure 3:
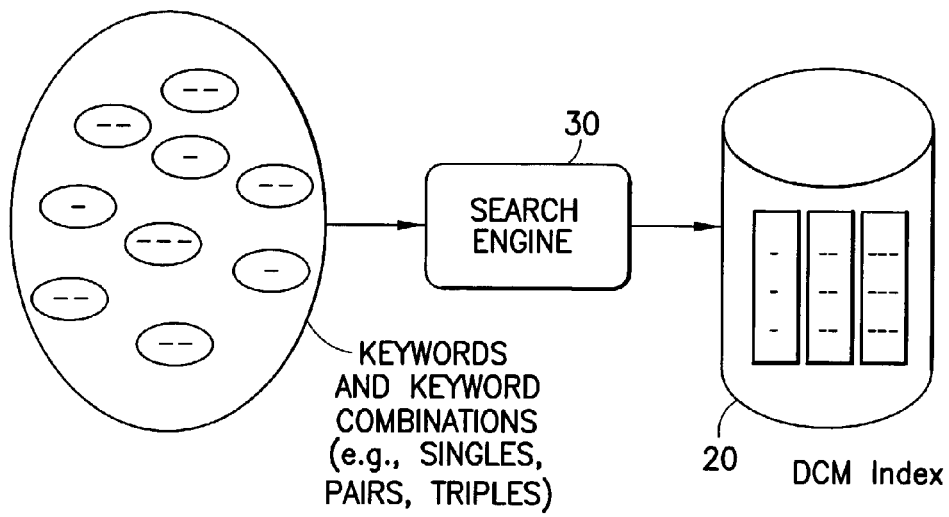
FIG. 3 graphically illustrates a process of domain characterization model (DCM) index generation in accordance with an aspect of this invention.

The DCM index 20 is preferably created (and maintained) at least in part by the search engine 10, or it could be created (and maintained) at least in part by a separate search engine 30, as shown in FIG. 3. The mechanics of creating an index for a collection of documents is well known in the art. One suitable type of index is referred to as an inverted index.

An inverted index is a data structure, and functions as an index into a set of texts. The index is accessed by some search method. Each index entry gives the word and a list of texts, possibly with locations within the text, where the word occurs. Reference may be had to http://www.nist/gov/dads/HTML/invertedIndex.html).

In the preferred DCM index 20 a given entry includes a single keyword or collection of keywords and an identification of a document or documents within a particular domain 1A that contains the keyword or collection of keywords.

The most useful keywords are those found in only one domain 1A, while still useful keywords are those found in only two domains 1A. As can be appreciated, as the number of domains 1A increases wherein a particular keyword or particular keyword combination is found, the usefulness of that keyword or keyword combination as a searching tool by the search engine 10 is reduced.

As was stated above, the DCM index 20 is constructed using all of the keywords that characterize the search domains to be covered. To select the most suitable keywords for a certain search domain (e.g., Domain1) from all keywords extracted from a document collection within the domain 1A, the following procedure is performed. Reference is also made to the logic flow diagram of FIG. 5A, as well as to FIG. 4.

Figure 4:
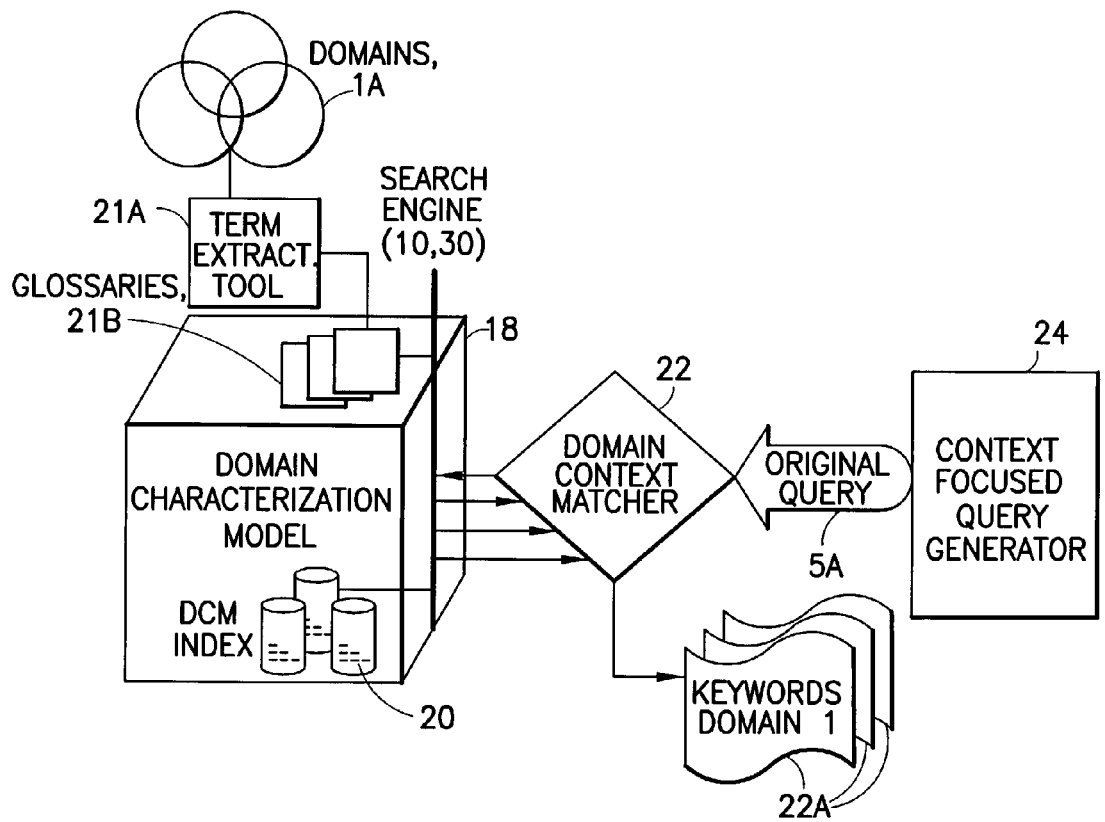
FIG. 4 shows in greater detail the relationships between the DCM, Domain Context Matcher and Context Focused Query Generator modules that are illustrated in FIG. 2.
Figure 5A:
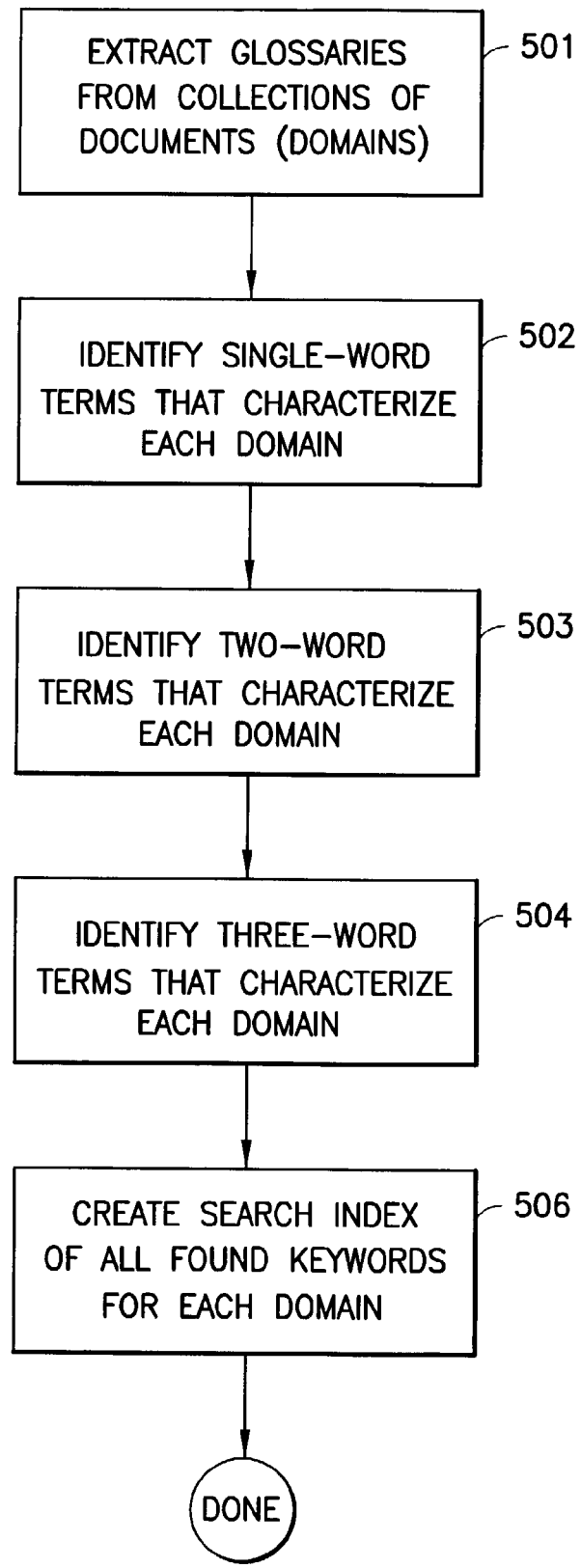
FIG. 5A is a logic flow diagram illustrating a method for selecting most suitable keyword combinations for a certain search domain from all keyword combinations extracted from a document collection within the domain.

At step 501 the method creates glossaries 21B of terms for each existing domain 1A (document collection), using any suitable term extraction tool or tools 21A (see FIG. 4). Suitable, non-limiting examples of term extraction tools 21A that can be utilized to practice this invention include GATE (http://gate.ac.uk/) and TERMINAE (http://citeseer.nj.nec.com/471143.html). Reference can also be made D. Bourigault, C. Jacquemin, "Term Extraction+Term Clustering: An Integrated Platform for Computer-Aided Terminology", In Proceedings of the European Chapter of the Association for Computational Linguistics (EACL '99), pages 15-22, Bergen, 1999 (http://citeseer.nj.nec.com/bourigault99term.html).

At step 502, using the glossaries 21B of extracted terms, the method selects single-keywords that characterize each domain by appearing (ideally) only in a single document collection, and that do not appear in any other document collection (i.e., in any other search domain 1A). At step 503 the method selects double-keyword combinations that (ideally) appear only in the given document collection, and do not appear in any other document collection. At step 504 the method selects triple-keyword combinations that (ideally) appear only in the given document collection, and do not appear in any other document collection. This process continues, if desired, to form larger keyword combinations until no larger keyword combinations can be derived, or until some predetermined limit threshold is reached. Note that it may not be possible in all instances to find a keyword or keywords that appear in only one domain 1A. Finally, at step 506 the method creates the DCM search index 20 using all found keywords for each domain 1A The selected keyword combinations for each search domain are indexed by a search engine, which could be the search engine 10 or a special purpose search engine 30, as illustrated in FIG. 3, and the results are stored in the DCM index 20, with each set of keywords being associated with a certain one of the domains 1A.

In operation, an original user-entered search query 5A is submitted against the DCM index 20 to retrieve those keywords that are relevant to the original search query 5A and, therefore, to identify the corresponding topics or search domains that are deemed to be related to the original search query 5A. In this manner, and for each original query 5A, a set of relevant search domains 1A is identified or targeted. These relevant search domains 1A, in turn, define the contexts of suggested search subjects. Then, the keywords that characterize the search domain(s) are combined with the search query 5A, and are submitted to the main data source(s) and/or search engine(s) to retrieve the relevant documents, more specifically network addresses or links to the relevant documents.

Given a particular instance of a user search query 5A, the goal of the context identification process is to associate the search query with a set of related search domains 1A. This is achieved by submitting the given search query against the DCM index 20 to obtain one or more keywords. This process can employ known techniques, such as text characterization and text analysis techniques. Various prepared glossaries can be used, along with suitable text analysis tools. If no direct keyword match is found for the given instance of the search query 5A, then similar keywords can be retrieved and used instead.

Figure 5B:
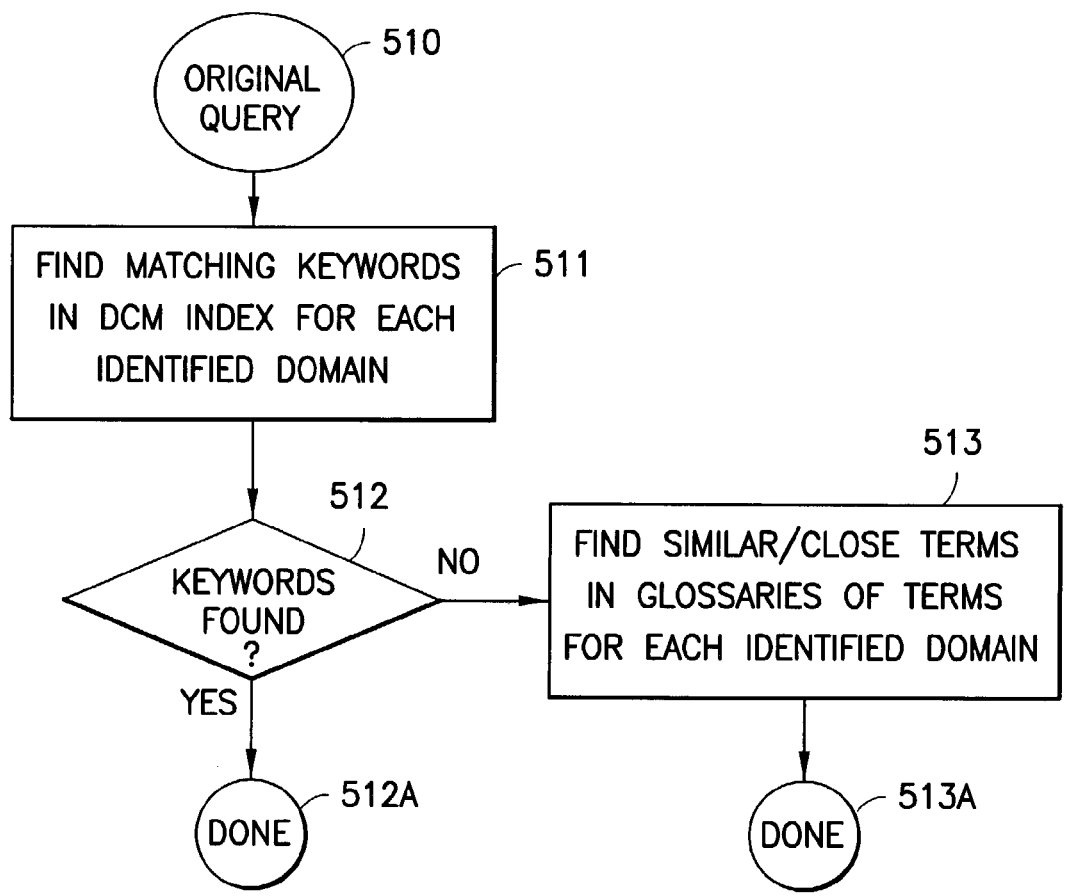
FIG. 5B is a logic flow diagram that illustrates the operation of the Domain Context Matcher shown in FIG. 2.

FIG. 5B is a logic flow diagram that illustrates a method for operating the Domain Context Matcher 22. At step 510 the original query 5A is received. At step 511 the method finds matching keywords in the DCM index 20 for each identified domain 1A. At step 512 a determination is made as to whether keywords were found. If keywords were found in the DCM index 20, then the keywords 22A are returned to the context focused query generator 24, and the method terminates at 512A. If keywords are not found at step 512, control passes to step 513 to find similar or close terms in the previously created glossaries 21B of terms for each domain 1A (see step 501 of FIG. 5A). The similar or close terms are returned then as keywords to the context focused query generator 24, and the method terminates at 513A. Note that the matching keywords 22A are clustered, as each is associated with some domain 1A. A final set of the search domain contexts 22A are assigned to the search query 5A by the domain context matcher 22, as shown in FIG. 4. Each identified search domain context 22A has an associated list of relevant keywords obtained from the DCM index 20.

The context focused query generator 24 processes the lists of keywords for each identified search domain 1A (reflected in the search domain contexts 22A), and selects the most relevant combinations that will be used to extend or enhance the original query 5A. This process operates by selecting the highest rank additional keywords from the DCM index 20 for each identified domain. The selected keywords are passed to the advanced query processor 14 over data paths 24A.

The advanced query processor 14 in turn issues one or a plurality of parallel context focused queries (the advanced query 14A), based on the number of suggested search domains 1A. That is, if the selected keywords are associated with one domain 1A, then one corresponding advanced query 14A is formed by appending (or pre-pending) the original query 5A with the selected keywords and/or keyword combinations:

advanced query 14A=original query 5A+keyword(s).

If the selected keywords are associated with more than one domain 1A (n domains 1A) then more than one advanced query 14A is formed and issued by appending (or pre-pending) the original query 5A with the selected keywords from each of the associated domains 1A:

advanced query$_1$ 14A=query 5A+keywords for domain_1;

advanced query$_2$ 14A=query 5A+keywords for domain_2; . . .

advanced query$_n$ 14A=query 5A+keywords for domain_n.

In response to the launching of multiple parallel search queries, the search engine 10 produces several sets of search results, one for each issued advanced search query. The top results for each advanced search query contain documents from the associated targeted domain. All of the sets of search results are collected by the advanced results processor 16. The search results are clustered and may be further refined based on the identified search domains.

More specifically, the results of the search are presented in the following categorized format:

1. If a domain 1A is completely defined by the original search term(s), i.e., by the original query 5A, the results page contains the most relevant documents from that domain.

2. Otherwise the results page contains links to documents, categorized by associated domains 1A and possibly by their refinements (subsets of documents within a given domain).

Figure 6:
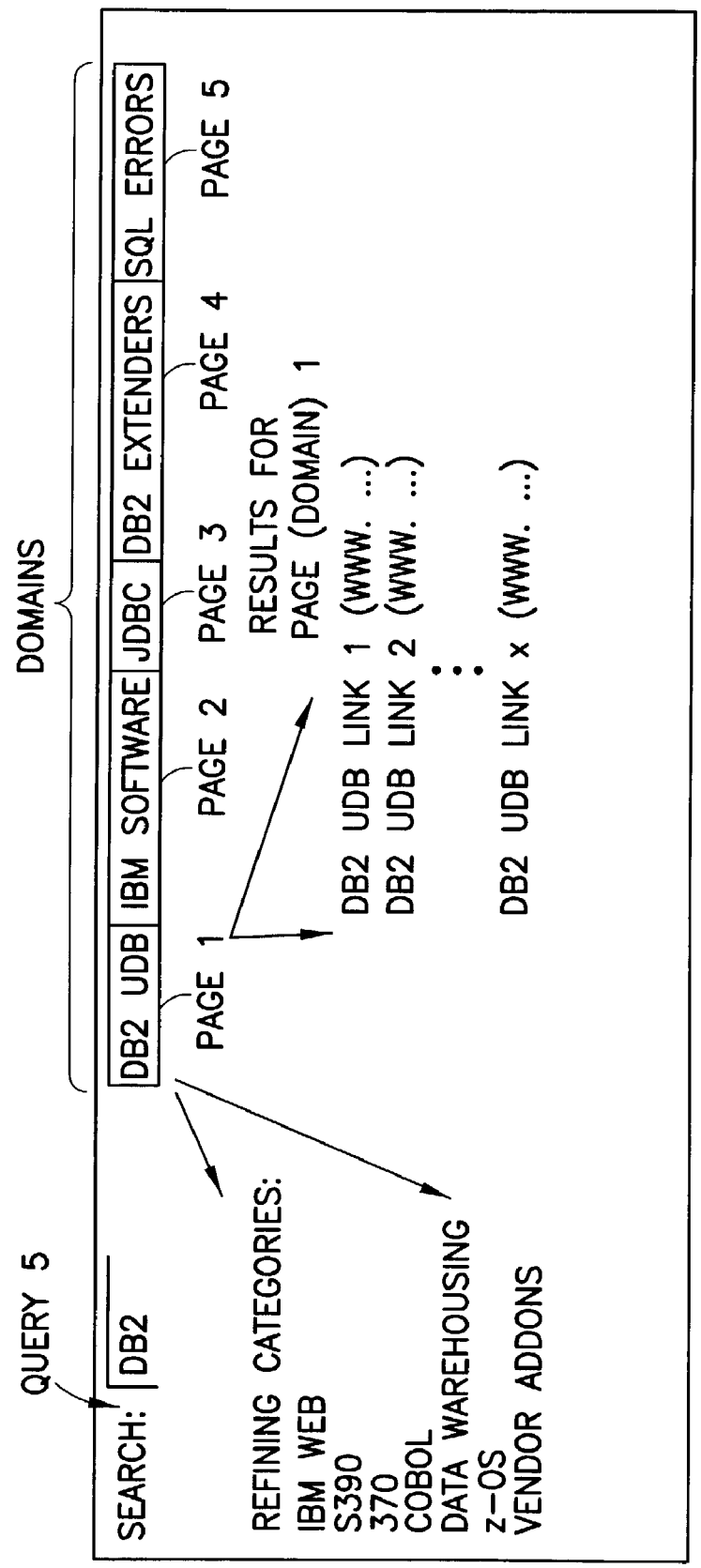
FIG. 6 is an exemplary search result that would be presented to a user of the client subsystem of FIG. 2, in accordance with the teachings of this invention.

FIG. 6 illustrates this procedure when the original search query phrase, in this case "DB2", does not completely define the search domain. In the top right corner of the display screen are shown various domains suggested by the domain context matcher 22, including DB2 Universal Database "DB2 UDB" (which is the currently selected and illustrated page of results in this example), "IBM Software", Java Database Connection or "JDBC", etc. The left column provides possible refinements of the query results of the currently displayed domain 1A, or the DB2 UDB domain in this case.

Thus, entering the original query 5A of "DB2" results in the operation of the advanced query processor 14 and the advanced results processor 16, in cooperation with the above-described domain characterization model (DCM) module 18, the DCM Indices 20, the Domain Context Matcher 22 and the Context Focused Query Generator 24. The result is the automatic identification of a plurality of relevant domains 1A and the parallel launching of enhanced queries that are targeted or focused to each identified domain. The enhanced query results are then made available in a unified manner to the user, along with possible options for refining the search into a specific sub-set of documents in the relevant domain 1A. For example, clicking on the refining category "Vendor Add-ons" may launch another query into the associated sub-set of documents in the DB2 UDB domain 1A, or it could instead initiate a filtering action on the already obtained results so that only the document links associated with this particular sub-set of documents is displayed to the user by the query client 5.

Clicking instead on the page labeled "IBM Software" would cause to be displayed the search results that were obtained for that domain (i.e., the search results based on the "DB2" original query 5A combined with all related keywords found in the DCM index 20 that related to the "IBM Software" domain 1A), along with possible refining categories (sub-sets of documents) within the "IBM Software" domain 1A.

This invention thus provides a method to optimize and improve search results relevancy based on an automatic search context identification, and also provides a technique to dynamically locate those domains 1A that are relevant to a particular instance of an original search query 5A. This invention also provides a method for search results categorization, a method and model to specify search domain(s) using the domain characterization model 18, as well as an index structure and model 20 for identifying topics related to a given original search query. The method also provides a technique for generating domain-specific query related terms.

While described in the context of presently preferred embodiments of this invention, the teachings of this invention are not intended to be limited to only the presently preferred embodiments, as those skilled in the art may derive various modifications to these embodiments when guided by the foregoing description and drawings. However, all such modifications will still fall within the scope of this invention.

What is claimed is:

1. A method to operate at least one computer for searching a search space comprised of domains each representing a collection of related documents, comprising:
    establishing a domain characterization model (DCM) comprising a DCM index containing sets of individual keywords and keyword combinations, each set characterizing a context of a particular domain of a plurality of domains of a search space, where the DCM index includes at least one entry comprised of individual keywords and keyword combinations of the set and an identification of the particular domain where the individual keywords and keyword combinations of the set are found; and
    automatically in response to an original search query:
        operating a domain context matcher against the DCM index to identify at least one relevant search subject context for the original search query and to identify keywords and keyword combinations for each identified context;
        identifying, using the DCM index, at least one particular domain of the plurality of domains from the identified relevant search subject context and the identified keywords and keyword combinations;
        processing the identified set of keywords and keyword combinations for each of the identified at least one particular domain to select at least one of the keywords or keyword combinations most relevant to enhance the original query and associated with the identified at least one particular domain;
        forming at least one enhanced domain-specific search query, said at least one enhanced search query being formed for targeting the identified at least one particular domain and comprising the original search query and the selected at least one keyword or keyword combination; and
        searching the identified at least one particular domain of the plurality of domains using the enhanced search query.

2. The method as in claim 1, further comprising, for the case where more than one particular domain is searched, displaying search results organized by the domains that were searched.

3. The method as in claim 1, further comprising displaying search results obtained for a first domain that was searched, and further displaying an identification of at least one other domain that was searched, and in response to a user selecting the at least one other domain, displaying the search results obtained for the selected at least one other domain.

4. The method as in claim 1, where a plurality of enhanced search queries are issued to a search engine to search a plurality of identified particular domains in parallel.

5. The method as in claim 1, where a plurality of enhanced search queries are issued to a search engine to simultaneously search a plurality of identified particular domains.

6. The method of claim 1 further comprising:
    clustering the search results by the domain or domains that are searched; and
    displaying the clustered search results to the user.

7. The method as in claim 6, where establishing the DCM includes operating a term extraction tool to locate sets of individual keywords and keyword combinations comprising locating, in order, individual keywords that are found in only one domain, double-keyword combinations that are found in the only one domain, and triple-keyword combinations that are found in the only one domain, where the locating ends when one of, no larger keyword combinations can be located or a predetermined threshold is reached, and operating a search engine to index the located keywords and keyword combinations as at least one entry in the DCM index.

8. A search system to search a search space comprised of a combination of hardware and software of one or a plurality of computers configured to establish a domain characterization model (DCM) comprising:
    a DCM index containing sets of individual keywords and keyword combinations, each set characterizing a context of a particular domain of a plurality of domains of a search space, where the DCM index includes at least one entry comprised of individual keywords and keyword combinations of the set and an identification of the particular domain where the individual keywords and keyword combinations of the set are found; and
    automatically responsive to an original search query,
        a module to operate a domain context matcher against the DCM index to identify at least one relevant search subject context for the original search query and to identify keywords and keyword combinations for each identified context;
        a module to identify, using the DCM index, at least one particular domain of the plurality of domains from the identified relevant search subject context and the identified keywords and keyword combinations;
        a module to process the identified set of keywords and keyword combinations for each of the identified at least one particular domains to select at least one of the keywords or keyword combinations most relevant to enhance the original search query and associated with the identified at least one particular domain; and
        a module to form at least one enhanced domain-specific search query, where said at least one enhanced search query is formed for searching the identified at least one particular domain of the plurality of domains and comprises the original search query and the selected at least one keyword or keyword combination.

9. The search system as in claim 8, wherein the combination of hardware and software of one or a plurality of computers is configured to display search results organized by the domains that were searched.

10. The search system as in claim 8, wherein the combination of hardware and software of one or a plurality of computers is configured to display search results obtained for a first domain that was searched, and to display an identification of at least one other domain that was searched, where said combination of hardware and software is configured to display search results being responsive to a user selecting the at least one other domain, to display the search results obtained for the selected at least one other domain.

11. The search system as in claim 8, wherein the combination of hardware and software of one or a plurality of computers is configured to issue a plurality of enhanced search queries to a search engine to search more than one particular domain in parallel, where the combination of hardware and software configured to issue is coupled to said combination of hardware and software configured to form said at least one enhanced search query.

12. The search system as in claim 11, wherein the combination of hardware and software of one or a plurality of computers is configured to issue a plurality of enhanced search queries simultaneously to a search engine to search more than one particular domain, where the combination of hardware and software configured to issue is coupled to said combination of hardware and software configured to form said at least one enhanced search query.

13. The search system as in claim 12, where said combination of hardware and software of one or a plurality of computers is configured to establish further comprises a term extraction tool to locate sets of individual keywords and keyword combinations comprising locating, in order, individual keywords that are found in only one domain, double-keyword combinations that are found in the only one domain, and triple-keyword combinations that are found in the only one domain, where the locating ends when one of, no larger keyword combinations can be located or a predetermined threshold is reached, and means for indexing the located keywords and keyword combinations as at least one entry in said DCM index.

14. A computer-readable data storage medium embodying a computer program, said computer program executable to direct a computer to operate a search system to search a search space that contains domains each representing a collection of related documents, execution of said computer program resulting in the performance of a method that comprises establishing a domain characterization model (DCM) that comprises a DCM index containing sets of individual keywords and keyword combinations, each set characterizing a context of a particular domain of a plurality of domains of a search space, where the DCM index includes at least one entry comprised of individual keywords and keyword combinations of the set and an identification of the particular domain where the individual keywords and keyword combinations of the set are found; and automatically in response to an original search query from a user:

operating a domain context matcher against the DCM index to identify at least one relevant search subject context for the original search query and to identify keywords and keyword combinations for each identified context;

identifying, using the DCM index, at least one particular domain of the plurality of domains from the identified relevant search subject context and the identified keywords and keyword combinations;

processing the identified set of keywords and keyword combinations for each of the identified at least one particular domains to select at least one of the keywords or keyword combinations most relevant to enhance the original search query and associated with the identified at least one particular domain; and forming at least one enhanced domain-specific search query, where said at least one enhanced search query is formed for searching the identified at least one particular domain of the plurality of domains and comprises the original search query and the selected at least one keyword or keyword combination, where search results are clustered and displayed to the user so as to be organized by domains that were searched.

15. The computer program as in claim 14, where a plurality of enhanced search queries are provided simultaneously to a search engine to search a plurality of the identified particular domains in parallel.

16. The computer program as in claim 14, where establishing further comprises locating sets of individual keywords and keyword combinations comprising locating, in order, individual keywords that are found in only one domain, double-keyword combinations that are found in the only one domain, and triple-keyword combinations that are found in the only one domain, where the locating ends when one of, no larger keyword combinations can be located or a predetermined threshold is reached, and operating a search engine to index the located keywords and keyword combinations as at least one entry in the DCM index.

* * * * *